United States Patent
McNamara et al.

(10) Patent No.: US 6,595,407 B2
(45) Date of Patent: Jul. 22, 2003

(54) FLEXIBLE FRAMING STATION TOOL GATE CHANGING METHOD AND APPARATUS

(75) Inventors: Jeffrey S. McNamara, Gross Ile, MI (US); William M. Faitel, New Baltimore, MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 10/267,938

(22) Filed: Oct. 9, 2002

(65) Prior Publication Data

US 2003/0071111 A1 Apr. 17, 2003

Related U.S. Application Data

(60) Provisional application No. 60/329,767, filed on Oct. 16, 2001.

(51) Int. Cl.[7] ............................................... B23K 5/22
(52) U.S. Cl. ..................... 228/212; 228/44.3; 228/49.4; 219/86.24; 198/345.1; 29/430
(58) Field of Search ................................. 228/212, 213, 228/44.3, 49.1, 49.4; 219/86.24; 198/345.1; 29/430, 464

(56) References Cited

U.S. PATENT DOCUMENTS

| | | | | |
|---|---|---|---|---|
| 3,776,401 A | * | 12/1973 | Ouska ........................ 414/361 |
| 4,494,687 A | * | 1/1985 | Rossi ........................ 228/49.6 |
| 4,682,722 A | * | 7/1987 | Bossotto et al. ............. 228/4.1 |
| 4,848,136 A | * | 7/1989 | Venalainen .................. 73/447 |
| 4,867,819 A | * | 9/1989 | Richardelli et al. ........... 156/92 |
| 5,111,988 A | * | 5/1992 | Strickland .................. 228/102 |
| 5,186,304 A | * | 2/1993 | Kaczmarek et al. ......... 198/346.1 |
| 5,191,958 A | * | 3/1993 | Tolocko .................... 198/346.2 |
| 5,251,739 A | * | 10/1993 | Tolocko .................... 198/346.2 |
| 5,313,695 A | | 5/1994 | Negre et al. .................... 23/33 |
| 5,397,047 A | * | 3/1995 | Zampini ..................... 228/6.1 |
| 5,400,943 A | * | 3/1995 | Rossi ......................... 228/6.1 |
| 5,560,535 A | * | 10/1996 | Miller et al. ............... 228/49.1 |
| RE36,541 E | * | 2/2000 | Rossi |
| 6,293,454 B1 | * | 9/2001 | Zhang et al. ................. 228/4.1 |
| 6,364,817 B1 | * | 4/2002 | McNamara et al. ........... 483/1 |
| 6,419,142 B1 | * | 7/2002 | Larsson ...................... 228/2.1 |

FOREIGN PATENT DOCUMENTS

EP            0848681            5/2002

* cited by examiner

Primary Examiner—Tom Dunn
Assistant Examiner—Kiley Stoner
(74) Attorney, Agent, or Firm—Reising, Ethington, Barnes, Kisselle, PC

(57) ABSTRACT

A flexible framing system including a framing station disposed along a vehicle body assembly line to receive and hold vehicle bodies for welding. A pair of framing gates is interchangeably supportable at the framing station. A pair of underbody tool support beams is also interchangeably supportable at the framing station. The gates and beams carry tools that positively locate and hold sub-elements of a vehicle body in predetermined positions relative to one another when the gates and beams are supported in respective framing positions engaging a vehicle body received at the framing station. A transport positioner disposed at the framing station moves the gates from respective supported positions at the framing station, interconnects the gates with the beams into a single gate-beam set, and moves the gate-beam set to a transport position for removal from the framing station.

24 Claims, 5 Drawing Sheets

FLEXIBLE FRAMING STATION TOOL GATE CHANGING METHOD AND APPARATUS

REFERENCE TO RELATED APPLICATION

Applicant claims the benefit of provisional application, Serial No. 60/329,767, filed Oct. 16, 2001.

BACKGROUND OF THE INVENTION

1. Field of the Invention

This invention relates generally to a flexible framing station tool changing method and apparatus and more specifically to a method and apparatus for changing out framing station side and underbody tooling gates.

2. Description of the Related Art Including Information Disclosed Under 37 CFR 1.97 and 1.98

In manufacturing automotive bodies, various body components such as roof, floor and side body sections must be joined together. In many framing systems, the body components are first loosely "toy-tabbed" together before they are welded. Toy tabbing allows enough freedom of relative movement between the body components to properly locate them before welding. The toy-tabbed body assembly is then moved to a framing station where locating fixtures engage it. The locating fixtures are carried by a pair of framing gates that are moved toward either side of the body by a framing drive system. The gates positively locate and hold the loosely assembled body components together long enough for welding machines or human welders to form enough welds between the body components to hold them rigidly together. Such systems typically include both side gates that engage vehicle bodies from the sides and underbody tooling support beams that engage vehicle bodies from below.

Some flexible framing systems include several interchangeable framing gate pairs, each of which is configured to support a specific automotive body configuration. Flexible framing systems of this type can be reconfigured to accommodate a different body style simply by removing one gate pair from a framing station and installing another.

A flexible framing system of this type may include both side tool gates and underbody tool support beams interchangeably supported adjacent a vehicle body assembly line conveyor. The conveyor in such a system passes through the framing station and supplies a series of loosely assembled vehicle bodies to the framing station for welding. The station supports side tool gates on either side of the path that the vehicle bodies follow into the framing station on the conveyor. The station in such a system also supports underbody tool support beams beneath the path of such vehicle bodies. Each set of side gates and underbody beams (gate-beam set) is dedicated to a specific vehicle body configuration, so the gate-beam sets are interchanged in preparation for changes in the type or configuration of vehicle body to be produced on the assembly line. Each framing gate and underbody beam carries tools in the form of locating fixtures and clamps that are positioned to positively locate and hold sub-elements of a specific vehicle body configuration in proper positions relative to each other for welding when the gates are supported in respective framing positions.

For example, U.S. Pat. No. 6,293,454 issued Sep. 25, 2001 to Zhang et al., discloses a flexible framing station having underbody framing gates. The underbody framing gates are removably supportable at the framing station. A framing gate drive removably supports one of the underbody framing gates at a time at the framing station and moves it between stowed and framing positions. In the stowed position an underbody framing gate is spaced downward from the conveyor. In the framing position, an underbody framing gate engages the underside of a vehicle body carried by the conveyor in the framing station.

U.S. Pat. No. 5,560,535 issued Oct. 1, 1996 to Miller et al. discloses framing gate pairs and an underbody support removably supportable at a framing station. A pair of upright side gate supports are movably supported at the framing station and detachably support one of the framing gate pairs at a time for reciprocal motion between respective stowed and framing positions. In the stowed position, the side gates are spaced from and generally parallel to either side of a vehicle body assembly line path passing between them. In the framing positions the side gates are disposed closer to the vehicle body assembly line path such that when a vehicle body assembly is disposed between the side gates of a side gate pair on the assembly line path, the locating fixtures supported on the gates engage and hold sub-elements of that vehicle body assembly in proper positions relative to each other for welding. A harmonic framing gate drive is operably connected to the side gate supports and moves the supports through a reciprocal motion that carries the gates between their stowed and framing positions. However, neither the Shang et al. system nor the Miller et al. system can install, remove, and store the underbody support together with the framing gate pairs.

BRIEF SUMMARY OF THE INVENTION

According to the invention, an apparatus is provided for changing out framing station side and underbody tooling. The apparatus includes a framing station configured to be disposed along a vehicle body assembly line in a position to receive and hold vehicle bodies for welding. A framing gate pair is interchangeably supportable at the framing station and includes two side gates. Each side gate carries tools positioned and configured to positively locate and hold sub-elements of a vehicle body in predetermined positions relative to one another when the two side gates are supported in respective framing positions on either side of a vehicle body received at the framing station. An underbody tooling support beam pair is also interchangeably supportable at the framing station and includes two underbody tooling support beams. Each gate of the underbody tooling support beam pair carries tools positioned and configured to positively locate and hold sub-elements of a vehicle body in predetermined positions relative to one another when the two underbody tooling support beams are supported in respective framing positions beneath a vehicle body received at the framing station. A transport positioner is disposed at the framing station and is configured to move the framing gate pair and the underbody tooling support beam pair from respective supported positions at the framing station. The transport positioner is also configured to interconnect the gates of the gate pair and the beams of the underbody tool support beam pair into a single gate-beam set and move the gate-beam set to a transport position for removal from the framing station.

The invention also includes a method for changing out framing station side and underbody tooling. According to this method one can change out framing station side and underbody tooling by first providing a framing station along a vehicle body assembly line in a position to receive and hold vehicle bodies for welding. A framing gate pair and an underbody tooling support beam pair are supported for framing operations at the framing station with each gate including tools configured and positioned to positively locate and hold sub-elements of a vehicle body in predetermined positions relative to one another. The gates and beams are moved from their respective supported positions at the framing station and interconnected into a single gate-beam set. The gate-beam set is then moved to a transport position and removed from the framing station.

According to another aspect of the inventive method, a second gate-beam set is provided including an interconnected framing gate pair and underbody tooling support beams connected to the side gates. The second gate-beam set is moved onto the framing station, and the individual gates of the second set of gates are moved into respective supported positions at the framing station for framing operations.

Objects, features and advantages of this invention include providing a flexible framing station gate change out system that simplifies and speeds the process of changing out and storing side and underbody framing gates, and that allows side and underbody framing gates to be removed, transported, stored, and installed together as a single gate-beam set.

BRIEF DESCRIPTION OF THE SEVERAL VIEWS OF THE DRAWINGS

These and other objects, features and advantages of this invention will be apparent from the following detailed description of the preferred embodiment(s) and best mode, appended claims, and accompanying drawings in which:

DETAILED DESCRIPTION OF THE PREFERRED EMBODIMENT

Figure 1:
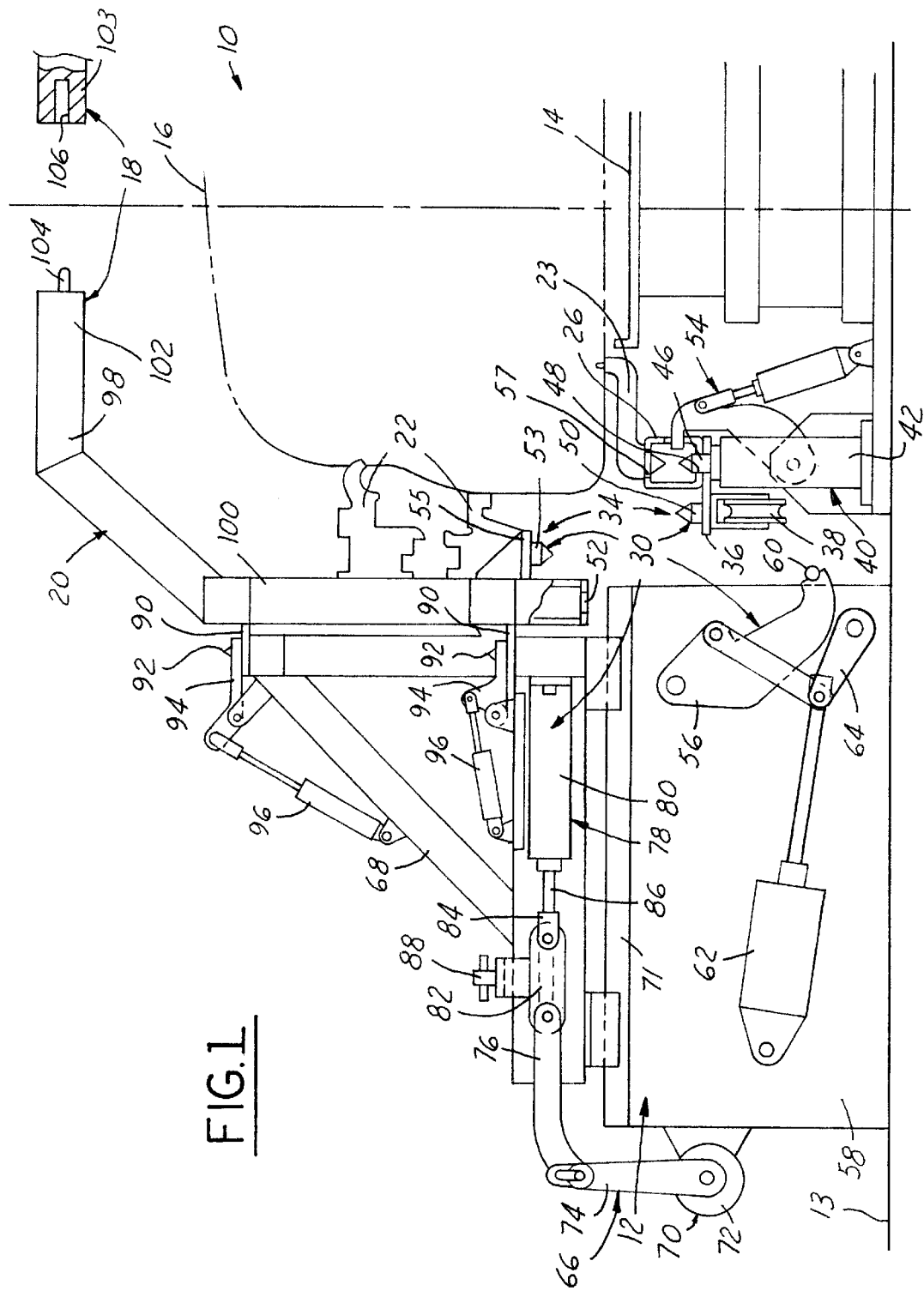
FIG. 1 is a partially cut-away end view of one of two sides of an apparatus constructed according to the invention and showing a side and an underbody tooling support beam of the apparatus in respective framing positions relative to a vehicle body shown in phantom.
Figure 3:
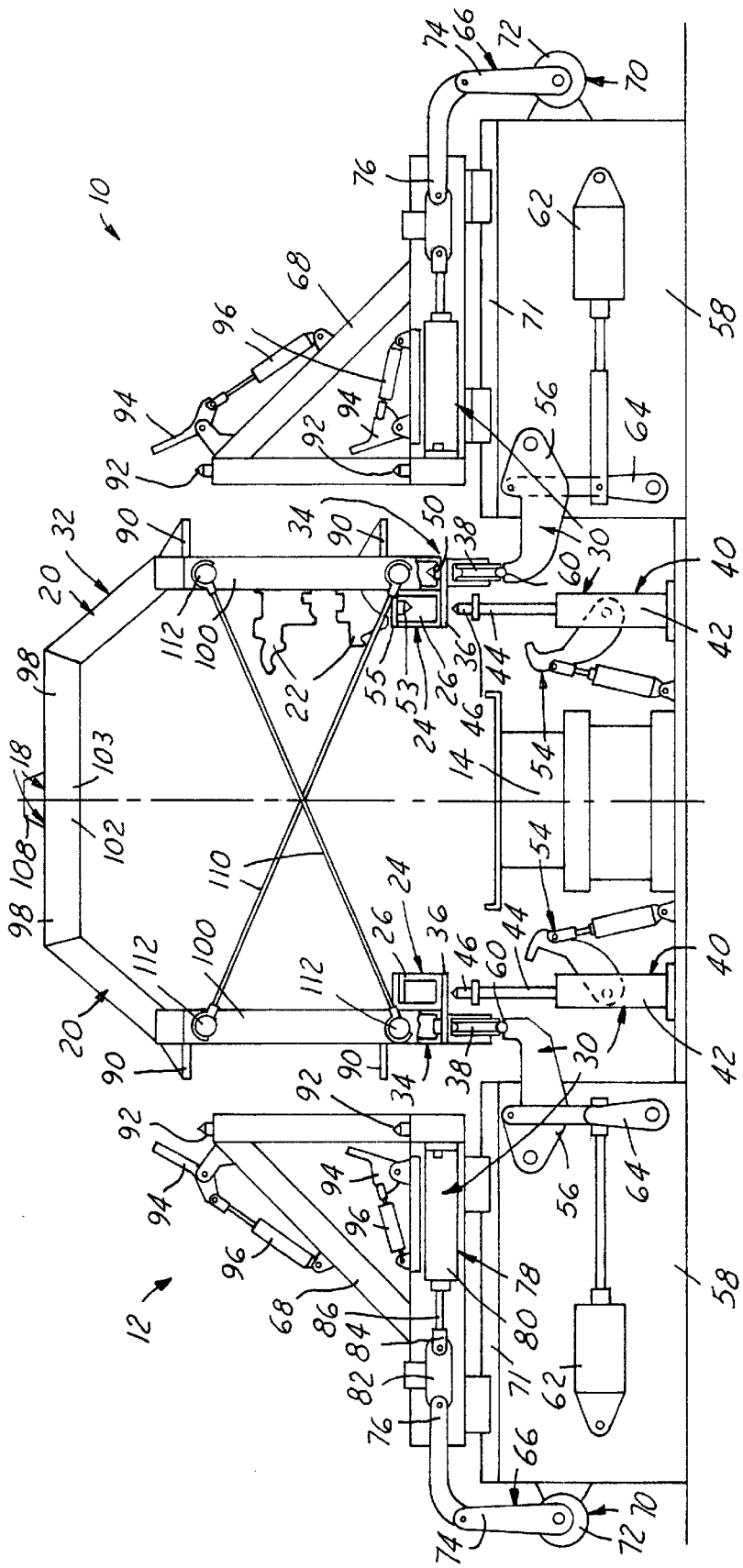
FIG. 3 is a partially cut-away end view of both sides of the apparatus of FIG. 1 and showing the side and underbody tooling support beams interconnected as a single gate-beam set in a transport position.
Figure 4:
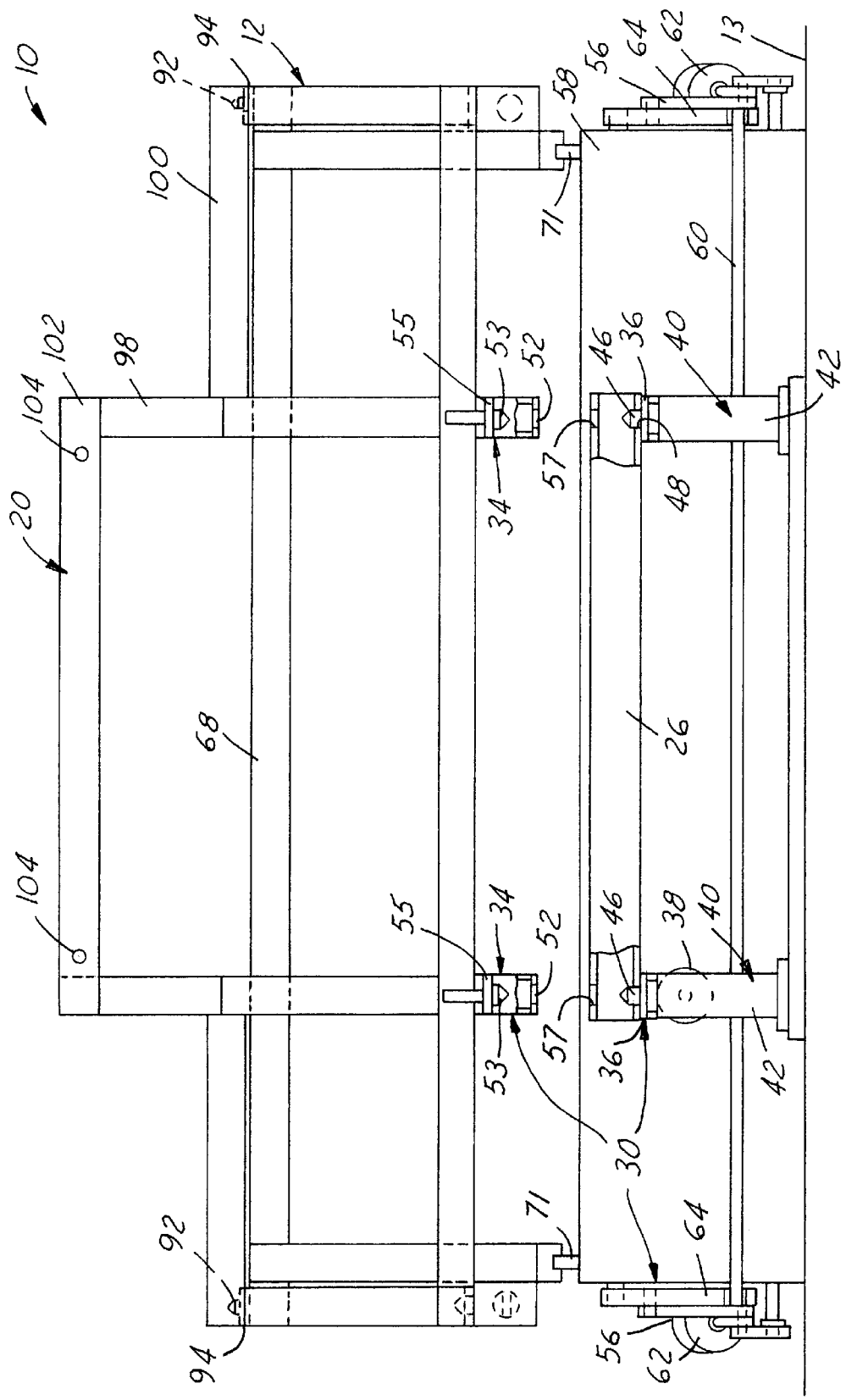
FIG. 4 is a partially cut-away top view of one of the two sides of the apparatus of FIG. 1 and a fragmentary top view of the other of the two sides of the apparatus of FIG. 1.
Figure 5:
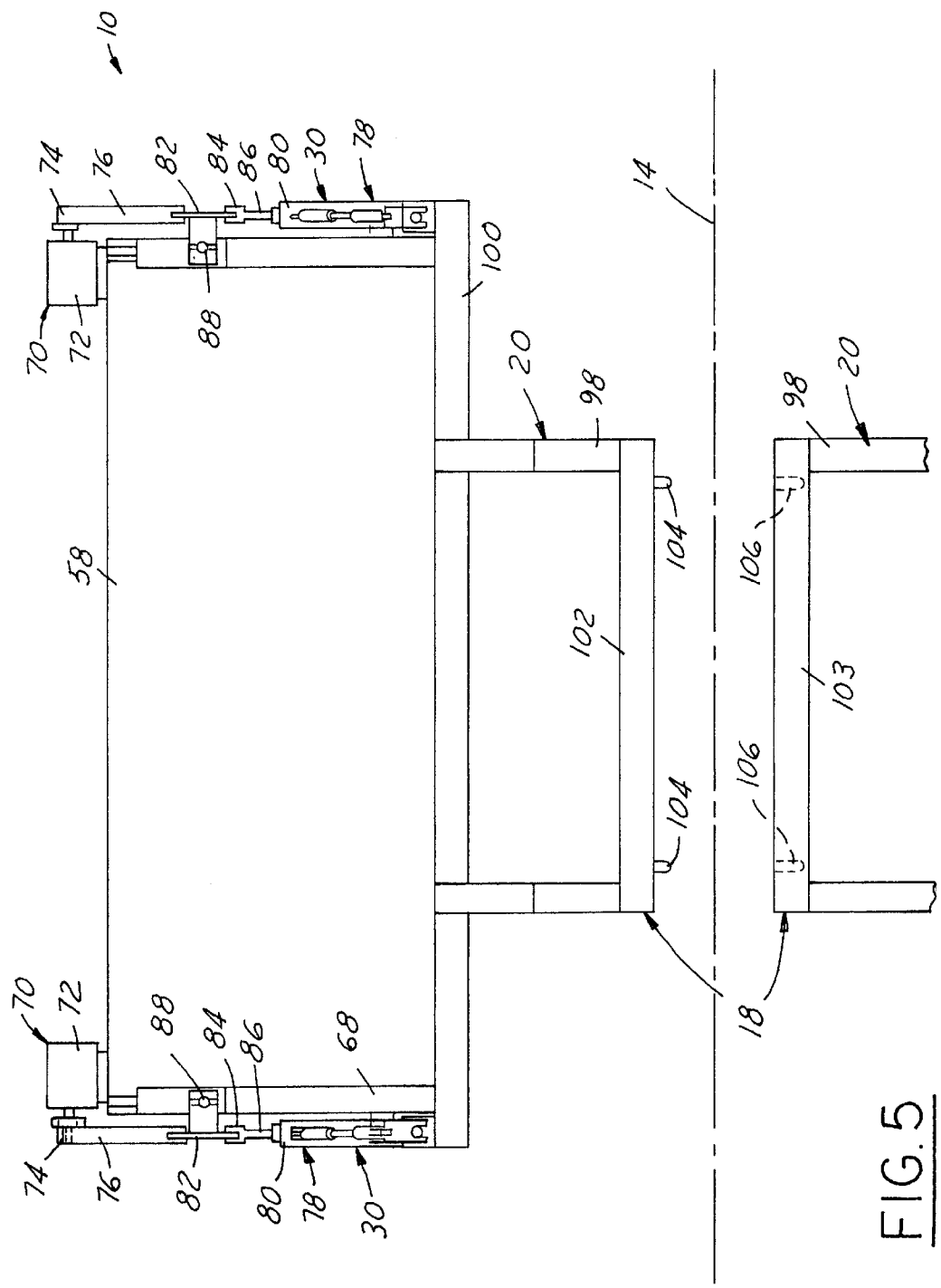
FIG. 5 is a side view of one of the two sides of the apparatus of FIG. 1 taken along line 5—5 of FIG. 3.

An apparatus for changing side and underbody framing gates is shown in the drawings. The apparatus 10 includes a framing station 12 disposed on a support surface 13 along a vehicle body assembly line 14 in a position to receive and hold vehicle bodies 16 for welding. The apparatus 10 also includes a framing gate pair 18 interchangeably supportable at the framing station 12 and including two framing gates 20. Each framing gate 20 carries tools 22 such as locating fixtures and clamps. The locating fixtures are for moving the sub-elements of a vehicle body 16 into desired positions relative to one another for welding, and the clamps are to hold the sub-elements in those relative positions during welding operations. The tools 22 positively locate and hold sub-elements of a vehicle body 16 in pre-determined positions relative to one another when the two framing gates 20 are supported in respective framing positions on either side of a vehicle body 16 received at the framing station 12 as shown in FIGS. 1 and 5. The apparatus 10 also includes an underbody tooling support beam pair 24 interchangeably supportable at the framing station 12 and including two underbody tooling support beams 26. Each underbody tooling support beam 26 also carries tools 22 such as locating fixtures and clamps. The underbody tools 23 are positioned to positively locate and hold sub-elements of a vehicle body 16 in predetermined positions relative to one another when the two underbody tooling support beams 26 are supported in respective framing positions beneath a vehicle body 16 received at the framing station 12 as best shown in FIG. 1. A transport positioner 30 is disposed at the framing station 12 and moves the framing gate pair 18 and the underbody tooling support beam pair 24 from respective supported positions at the framing station 12 to a transport position, as best shown in FIG. 3, for removal from the framing station 12.

The transport positioner 30 is also designed to move a gate-beam set 32 from the transport position in the framing station to respective supported positions on the framing station 12 for framing operations. In other words, the transport positioner 30 assembles gates 20 and beams 26 into a gate-beam set 32 for transport and separates gate-beam sets 32 at the framing station 12 and positions the individual gates 20 and beams 26 of such gate-beam sets 32 for framing operations.

Each framing gate 20 of a framing gate pair 18 is connected to and supported on one of the underbody tooling support beams 26 of a corresponding underbody tooling support beam pair 24 when the two gate pairs 18, 24 are interconnected into a single gate-beam set 32 for transport. A gate interconnect 34 of the transport positioner 30 connects the underbody tooling support beams 26 and framing gates 20 as described above and includes gate interconnect brackets 36 fixed along a bottom edge of each of the under body beams 26. Gate wheels 38 are attached to each of the gate interconnect brackets 36 in positions to support the underbody tooling support beams 26 for transport when the gates 20 and beams 26 are interconnected as a gate-beam set 32.

The gate interconnect 34 also includes four beam lifters 40, two of which are supported on the support surface 13 beneath one of the underbody tooling support beams 26. Each of the four beam lifters 40 includes a lifter housing 42 and an extendable lifter rod 44 supported within the lifter housing 42. Four lifter pins 46 are mounted on upper ends of the respective lifter rods 44. The lifter pins 46 are normally snugly received in corresponding lifter pin apertures 48 formed along the bottom edges of the underbody tooling support beams 26.

The gate interconnect 34 of the transport positioner 30 further includes four side gate interconnect bracket pins 50 mounted on and extending upward from respective top surfaces of the respective gate interconnect brackets 36. The side gate interconnect pins 50 are positioned to be snugly received in corresponding interconnect bracket pin apertures 52 formed along bottom surfaces of the framing gates 20.

Figure 2:
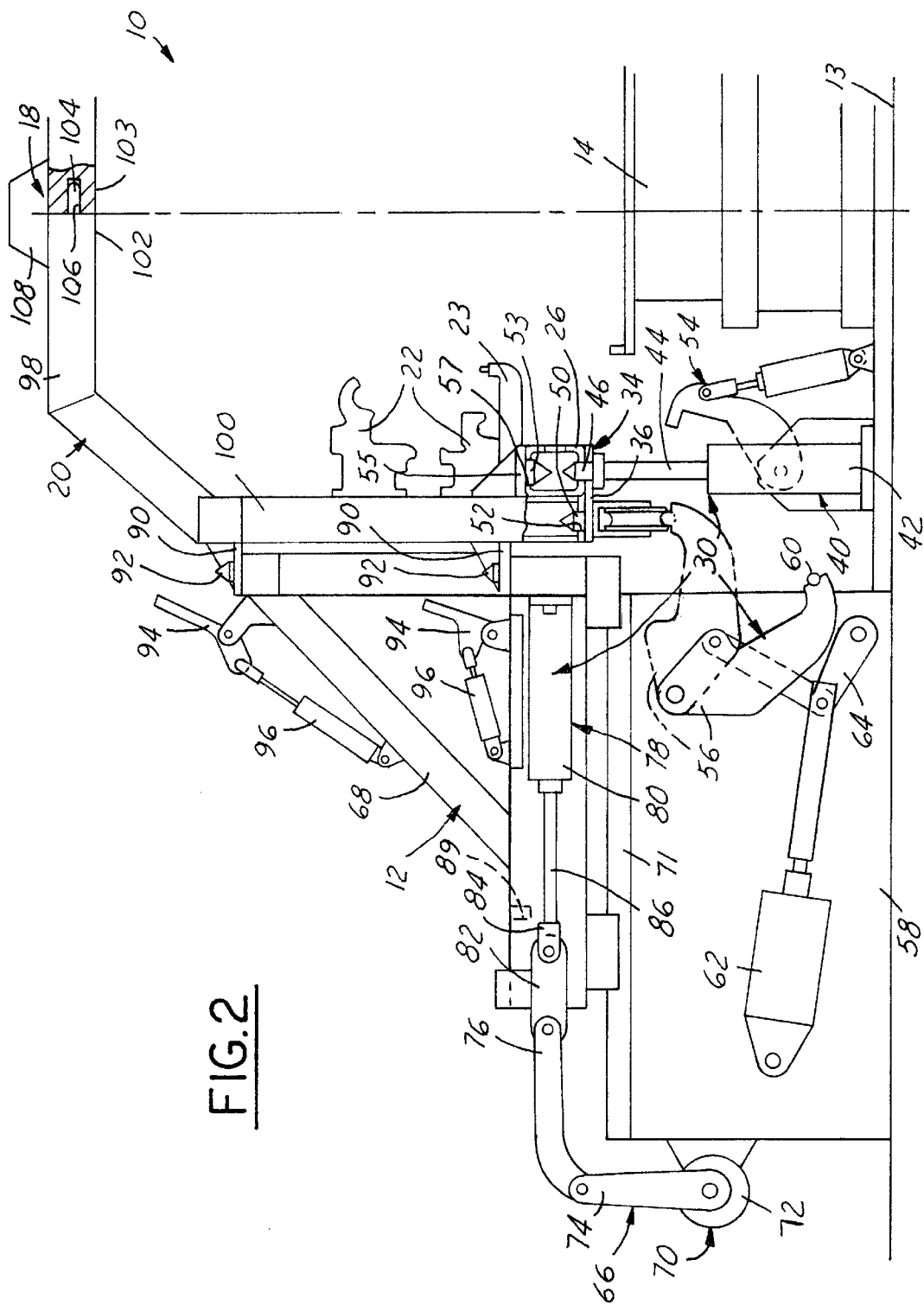
FIG. 2 is a partially cut-away end view of the same side of the apparatus shown in FIG. 1 and showing the underbody tooling support beam engaging the side gate with the side gate still supported on a movable gate support of the invention.

As shown in FIGS. 1–3, the gate interconnect 34 further includes four gate lift pins 53 that extend downwardly from respective gate lift brackets 55. The gate lift brackets 55 extend horizontally inward from the framing gates 20 and position the gate lift pins 53 in vertical alignment with corresponding gate lift pin apertures 57 formed in upper surfaces of the underbody tooling support beams 26 when the framing gates 20 are in respective pre-transport positions as shown in FIG. 2.

As best shown in FIG. 1, support beam clamps 54 engage each of the underbody tooling support beams 26 such that the underbody tooling support beams 26 do not sway or rock on the lifter housing 42 while the framing station 12 is in use and the beam lifters 40 are in respective down positions holding the underbody tooling support beams 26 in respective framing positions. The underbody tooling support beam lifters move the underbody tooling support beams 26 between their framing positions as shown in FIG. 1, and the positions shown in FIG. 2. The underbody tooling support beams 26 connect to their respective corresponding framing gates 20 with the side gate interconnect pins 50 engaging the interconnect bracket pin apertures 52 when the underbody tooling support beams 26 are in their respective gate attachment positions as shown in FIG. 2.

The transport positioner 30 also includes four lift arms 56, two of which are pivotally mounted on one of two framing gate support bases 58 disposed on each side of the vehicle body assembly line 14. Each pair of lift arms 56 carries one of two parallel framing station rails 60 between respective retracted positions, as shown in FIGS. 1 and 2, and lower support positions, as shown in phantom in FIG. 2. In their lower support positions, the framing station rails 60 engage the gate wheels 38 of respective underbody tooling support beams 26 so that, together, the two rails 60 are supporting the weight of an interconnected gate-beam set 32. In their retracted positions, the framing station rails 60 are held clear of the underbody tooling support beams 26 so that when the underbody tooling support beams 26 move between the framing and transport positions there is no contact between the underbody tooling support beams 26 and the rails 60.

The lift arms 56 further carry the framing station rails 60 upward from their lower support positions to respective upper support positions that position the gate-beam set 32 in a transport position as shown in FIG. 3. When a supported gate-beam set 32 is in its transport position the framing station rails 60 are aligned with other rails (not shown) positioned outside the framing station to move gate-beam sets 32 on and off the framing station 12. Each of the gate lift arms 56 is driven by a lift arm actuator 62 drivingly coupled to a linkage 64 that is, in turn, drivingly coupled to a gate lift arm. Through the linkages 64, the lift arm actuators 62 drive the respective gate lift arms 56 and framing station rails 60 between their retracted positions and their upper and lower support positions.

The framing gates 20 are movable past their respective framing positions, shown in FIG. 1, to their respective pre-transport positions, shown in FIG. 2. In their pre-transport positions, the framing gates 20 engage one another, the side gate interconnect pins 50 on the gate interconnect brackets are vertically aligned below the interconnect bracket pin apertures 52 in the framing gates 20, and, as described above, the gate lift pins 53 are vertically aligned above their corresponding gate lift pin apertures 57 in the underbody tooling support beams 26.

To move the framing gates 20 between their framing and pre-transport positions, as well as respective stowed positions shown in FIG. 3, the framing station 12 includes a framing gate drive 66. The framing gate drive 66 is operably connected to the framing gates 20 through four framing gate supports 68. In the stowed positions the framing gates 20 are disposed in positions spaced from and generally parallel to a vehicle body assembly line 14 path passing between them. In the framing position shown in FIG. 1, the framing gates 20 are disposed closer to the vehicle body assembly line 14 path such that when a vehicle body 16 assembly is disposed between the gates 20 on the path, the tools 22 supported on the gates 20 engage and hold sub-elements of that vehicle body 16 assembly in proper positions relative to each other for subsequent welding operations at the framing station 12.

The framing gate drive 66 includes harmonic drives 70 that move the framing gate supports 68 through a lateral reciprocal motion that carry the framing gates 20 between their respective stowed and framing positions on either side of a vehicle body 16 during framing operations. Each of the framing gate supports 68 is mounted on a pair of parallel low friction frame support rails 71. Each pair of frame support rails 71 is fixed to a top surface of one of the two frame support bases 58. Each harmonic drive 70 includes a reversible motor 72 that drives an arm 74 and a link 76 that is coupled to one of the framing gate supports 68. The rotation of the motors 72 back and forth causes the arms 74 and the links 76 to reciprocate back and forth driving the supports 68 and the framing gates 20 between their stowed and framing positions. In other embodiments, the gate drive mechanism may be of any type known in the art to include the mechanism disclosed in U.S. Pat. No. 5,560,535 issued Oct. 1, 1996 and assigned to the assignee of the present invention.

As best shown in FIGS. 1–3, the framing gate drive 66 also includes a side gate transport drive 78 of the transport positioner 30. The side gate transport drive 78 includes a gate position cylinder 80 that moves the framing gate supports 68 in such a way as to the drive the framing gates 20 past their respective framing positions shown in FIG. 1 to their respective pre-transport positions shown in FIG. 2. To accomplish this, each link 76 is attached to a slide 82 that is coupled to clevis 84 mounted on the end of a drive rod 86 of a corresponding gate position cylinder 80. Lock pins 88 engage apertures 89 in the frame gate support 68 to fix the positions of the slides 82 relative to their corresponding supports 68. Distal ends of the gate cylinders 80 are attached to their corresponding supports 68. With the lock pins 88 in place as shown in FIG. 1, the gate position cylinders 80 are not able to extend the drive rods and the positions of the gates are controlled by the links 76 and the harmonic drives 70 for framing operations. With the lock pin 88 removed as shown in FIGS. 2 and 3, the positions of the side gates 20 are controlled by the gate position cylinders 80. Once the harmonic drives 70 have positioned the gates in their respective framing positions, the lock pins 88 can be removed and the gate position cylinders 80 used to move the framing gates 20 from their respective framing positions to their respective pre-transport positions.

Each of the framing gates 20 is removably mounted on its frame support 68 by upper and lower gate mounting brackets 90 that mate with upper and lower gate mounting pins 92 supported on the gate supports 68. Gate mounting bracket clamps 94 are also supported on the supports 68 and lock the upper and lower gate mounting brackets 90 on the gate mounting pins 92 for framing operations. The gate mounting bracket clamps 94 are actuated between engaged and released positions by gate clamp cylinders 96. With the gate mounting bracket clamps 94 open, the upward motion of the framing station rails 60 from their lower to the upper support positions disengages the underbody tooling support beams 26 from their underbody tooling support beam lifters and disengages the framing gates 20 from the framing gate supports 68 as best shown in FIG. 2.

To interconnect the framing gates 20 in the pre-transport and transport positions, each framing gate pair 18 includes a pair of releasably interconnecting extension frames 98. Each extension frame 98 is fixed along an upper edge of a lower tool-holding portion 100 of each framing gate 20 of each framing gate pair 18. The two extension frames 98 of each framing gate pair 18 releasably interconnect along respective interfacing edges of top beams 102, 103 of the extension frames 98. The top beams 102, 103 interconnect such that the framing gates 20 are held in relative positions accessible for engagement by the upright supports 68 of the framing station 12 when a gate-beam set 32 is moved into the framing station 12. Interconnection of the extension frames 98 also spaces the gates 20 and interconnect brackets 36 properly for the gate support wheels 38 to engage and be positioned to roll along the framing station rails 60 during transport.

The interfacing edge of one of the extension frame top beams 102, 103 of each gate pair includes top beam locating pins 104 engageable with corresponding top beam pin receptacles 106 in the interfacing edge of the other extension frame top beam 103. Engagement of the top beam locating pins 104 and their corresponding pin receptacles 106 positively locates the top beams 102, 103 and therefore the side gates 20 of each framing gate pair 18 in relation to one another for transport and for subsequent engagement with the supports 68 upon delivery to the framing station 12. Each framing gate pair 18 also includes one or more beam clamps as is schematically shown at 108 in FIG. 2. The beam clamps 108 hold the interconnecting extension frames 98 of each side gate pair 18 together in a proper relative orientation for transport and storage.

As shown in FIG. 3, each framing gate pair 18 includes two pairs of tie bars 110 that releasably connect between the two gates 20 of each framing gate pair 18. When connected, each pair of tie bars 110 forms an X configuration across opposite ends of the framing gate pair 18. The tie bars 110 hold the side gates 20 together and provide structural rigidity for transport and storage of a gate-beam set 32. Each framing gate 20 of each framing gate pair 18 includes two vertically spaced locking posts 112 on respective vertical end members 114 of the framing gates 20. The locking posts 112 each releasably engage one end of one of the tie bars 110 so that the bars can be easily installed for transport and storage and then removed for framing operations after a gate-beam set 32 has been newly installed at the framing station 12. The tie bars 110 each engage diagonally opposite locking posts 112 to form the X configuration.

In practice, a gate-beam set 32 including both the framing gate pair 18 and the underbody tooling support beam pair 18, 24, can be removed from the framing station 12 by first actuating the harmonic drives 70 to move the framing gates 20 of the framing gate pair 18 from their respective stowed positions (not shown) to their respective framing positions as shown in FIG. 1. The framing drive lock pins 88 are then removed from the slides 82 so that the gate position cylinders 80 can be extended, moving the framing gate supports 68 and the framing gates 20 inward from their respective framing positions toward their respective pre-transport positions as shown in FIG. 2. The gate position cylinders 80 are extended until the top beams 102 of each of the framing gates 20 abut one another and the top beam locating pins 104 of one top beam 102 are received into the top beam pin receptacles 106 of the other top beam 103. In this position, the side gate lift pins 53 are vertically aligned above their corresponding side gate lift pin apertures 57 in the underbody tooling support beams 26 and the side gate interconnect bracket pins 50 are vertically aligned below their corresponding interconnect bracket pin apertures 52 in the side gates 20. The support beam clamps 54 are then pulled out of engagement with their respective underbody tooling support beams 26, as shown in FIG. 2, so that the underbody tooling support beams 26 are free to be raised by the lifter rods 44 and the lifter pins 46 to respective positions where they engage the lifter pin apertures 48. With the underbody tooling support beams 26 and their respective raised pre-transport positions, the side gate interconnect bracket pins 50 engage the bracket pin apertures 52 and the side gate lift pins 53 engage the side gate lift pin apertures 57. This coupling of pins and sockets prevents relative sliding and rocking between the underbody tooling support beams 26 and the framing gates 20 during transport.

When the underbody tooling support beams 26 are in their raised pre-transport positions as shown in FIG. 2, the gate lift arms 56 can be raised by their respective actuators and linkages until the two framing station rails 60 contact the support wheels 38. The gate mounting bracket clamps 94 are then actuated to open and release the gate mounting brackets 90. An operator then places the cross tie bars 110 on the tie bar attachment posts. The lifter arm actuators are then energized to raise the respective gate lift arms 56 causing the framing station rails 60 to lift the gate-beam set 32 from the pre-transport position to the transport position as shown in FIG. 3.

Alternatively, once the gates have been brought together so that the beams 102, 103 are in contact, the lift arms 56 can be used to raise the gates and the underbody tooling from the framing position to the transport position in a single motion by first raising the gates with the lift cylinders 40. The cross braces 110 are then attached to the mounting posts 112. The lift arms 56 can then be raised from the lowered position to the fully raised position by engaging the wheels 38 with the rails 60 and lifting the gates 20 off the gate mounting pins 92.

In moving the gate-beam set 32 from the pre-transport position to the transport position shown in FIG. 3, the gate mounting brackets 90 are lifted free of the gate mounting pins 92 and the underbody tooling support beams 26 are lifted off the lifter pins 46. The gate position cylinder 80 then retracts the gate supports 68 away from the side gates 20 until the vertical beams 102 of the supports 68 are clear of the gate mounting brackets 90. A tractor mechanism or other means is then used to move the gate-beam set 32 including both side and underbody tooling support beams 26 as a unit out of the framing station 12. The support wheels 38 roll along the framing station rails 60 and onto other rail sections that form a rail path.

Once a gate-beam set 32 has been removed out of the framing station 12, a new gate-beam set 32 can be moved into the framing station 12. The side gates 20 and underbody support beams 26 of the new gate-beam set 32 are then moved into supported positions of the framing station 12 by repeating in reverse order the sequence of events described above.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

We claim:

1. A flexible framing apparatus for interchanging side and underbody framing station tooling, the apparatus comprising:
   a framing station configured to be disposed along a vehicle body assembly line in a position to receive and hold vehicle bodies for welding;
   a framing gate pair interchangeably supportable at the framing station and including two side gates, each of which carries tools positioned and configured to positively locate and hold sub-elements of a vehicle body in predetermined positions relative to one another when the two side gates are supported in respective framing positions on either side of a vehicle body received at the framing station;

an underbody tooling support beam pair interchangeably supportable at the framing station and including two underbody tooling support beams, each of which carries tools positioned and configured to positively locate and hold sub-elements of a vehicle body in predetermined positions relative to one another when the two underbody tooling support beams are supported in respective framing positions beneath a vehicle body received at the framing station; and a transport positioner disposed at the framing station and configured to move the framing gate pair and the underbody tooling support beam pair from respective supported positions at the framing station to interconnect the gates of the gate pair and the beams of the beam pair into a single gate-beam set and to move the gate-beam set to a transport position for removal from the framing station.

2. A flexible framing apparatus as defined in claim 1 in which the transport positioner is further configured to move each gate and beam of a second gate-beam set comprising interconnected side framing gates and underbody tool support beams to respective supported positions on the framing station for framing operations.

3. A flexible framing apparatus as defined in claim 2 in which each underbody tooling support beam of an underbody tooling support beam pair is connected to one of the side gates of a corresponding side gate pair when interconnected as a gate-beam set.

4. A flexible framing apparatus as defined in claim 3 in which each of the gates of each side gate pair is supported on one of the underbody tooling support beams of the underbody tooling support beam pair when interconnected as a gate-beam set.

5. A flexible framing apparatus as defined in claim 4 in which each of the underbody tooling support beams of each underbody tooling support beam pair includes gate wheels that support the gate-beam set for transport when the gates are interconnected as a gate-beam set.

6. A flexible framing apparatus as defined in claim 5 in which:

the transport positioner includes a pair of parallel rails movable between respective retracted positions and lower support positions; and when in their lower support positions, the rails engage the gate wheels of an interconnected gate-beam set and support the gate-beam set at the framing station.

7. A flexible framing apparatus as defined in claim 4 in which:

the side gates are movable inward past their respective framing positions to respective side gate interconnect positions where the side gates engage one another and are supported above the underbody tooling support beams; and the transport positioner includes underbody tooling support beam lifters configured to move the underbody tooling support beams between their framing positions and respective underbody tooling support beam attachment positions, the underbody tooling support beams connecting to their respective side gates in their gate attachment positions.

8. A flexible framing apparatus as defined in claim 7 in which:

the transport positioner includes lift arms that are pivotally mounted on each side of the vehicle body assembly line and configured to carry each of the rails between their retracted positions and lower support positions; and the lift arms are further configured to carry the rails upward from their lower support positions to respective upper support positions that position the gate-beam set in a transport position.

9. A flexible framing apparatus as defined in claim 2 in which each side gate pair includes a pair of releasably interconnecting extension frames, each extension frame being fixed to an upper edge of one of the gates of the side gate pair and configured to releasably interconnect along respective interfacing edges.

10. A flexible framing apparatus as defined in claim 9 in which each gate pair includes at least one pair of tie bars configured to releasably connect between the two gates of each gate pair.

11. A flexible framing apparatus as defined in claim 7 in which:

the framing station includes a pair of gate supports that support the framing gates for reciprocal motion between respective stowed positions spaced from and generally parallel to a vehicle body assembly line path passing between them and respective framing positions; and the framing positions are disposed closer to the vehicle body assembly line path such that when a vehicle body assembly is disposed between the gates on the path, locating fixtures supported on the gates engage and hold sub-elements of that vehicle body assembly in proper positions relative to each other for welding.

12. A flexible framing apparatus as defined in claim 11 in which the framing station includes a framing gate drive that is operably connected to the gates and that moves the gates between their stowed and framing positions.

13. A flexible framing apparatus as defined in claim 12 in which the transport positioner is configured to disengage the gates from the framing gate drive when moving the gate-beam set to the transport position.

14. A flexible framing apparatus as defined in claim 11 in which the framing drive is operatively connected to the gate supports and is configured to move the gate supports so as to drive the framing gates between their stowed and framing positions.

15. A flexible framing apparatus as defined in claim 14 in which the framing drive is configured to move the gate supports so as to drive the framing gates between their framing positions and their respective pre-transport positions.

16. A flexible framing apparatus comprising:

a framing station configured to be disposed along a vehicle body assembly line in a position to receive and hold vehicle bodies for welding;

a framing gate pair interchangeably supportable at the framing station and including two gates, each of which carries tools positioned and configured to positively locate and hold sub-elements of a vehicle body in predetermined positions relative to one another when the two gates are supported in respective framing positions on either side of a vehicle body received at the framing station;

an underbody tooling support beam pair interchangeably supportable at the framing station and including two underbody tooling support beams, each of which carries tools positioned and configured to positively locate and hold sub-elements of a vehicle body in predetermined positions relative to one another when the two underbody tooling support beams are supported in respective framing positions beneath a vehicle body received at the framing station; and a gate interconnect configured to connect each underbody tooling support beam of the underbody tooling support beam pair to one of the gates of the gate pair.

17. A flexible framing apparatus as defined in claim 16 in which the gate interconnect is configured to support each of the gates of the gate pair on one of the underbody tooling support beams of the underbody tooling support beam pair.

18. A flexible framing apparatus as defined in claim 17 in which the gate interconnect includes at least two wheels supported on each of the underbody tooling support beams of each underbody tooling support beam pair.

19. A flexible framing apparatus as defined in claim 16 in which the apparatus includes a second gate interconnect configured to releasably connect the gates of the gate pair together.

20. A method for interchanging framing station side and underbody tooling, the method including the steps of:

providing a framing station along a vehicle body assembly line in a position to receive and hold vehicle bodies for welding;

providing a framing gate pair and an underbody tooling support beam pair supported for framing operations at the framing station with each gate and beam including tools configured and positioned to positively locate and hold sub-elements of a vehicle body in predetermined positions relative to one another;

moving the gates from their respective supported positions at the framing station;

interconnecting the gates with the beams into a single gate-beam set;

moving the gate-beam set to a transport position; and removing the first gate-beam set from the framing station.

21. The method of claim 20 including, after the step of removing the first gate-beam set, the additional steps of:

providing a second gate-beam set including an interconnected framing gate pair and underbody tooling support beams connected to the side gates; and moving the second gate-beam set onto the framing station; and moving the individual gates and beams of the second gate-beam set into respective supported positions at the framing station for framing operations.

22. The method of claim 21 in which the step of interconnecting the gates with the beams includes connecting the beams of the underbody tooling support beam pair to the gates of the framing gate pair.

23. The method of claim 21 in which the step of interconnecting the gates with the beams includes supporting the underbody tooling support beams on the respective side gates.

24. The method of claim 20 in which the step of removing the first gate-beam set from the framing station includes:

supporting the gates on wheels;

supporting the wheels on rails leading from the framing station; and rolling the gate-beam set from the framing station on the rails.

\* \* \* \* \*